(12) United States Patent
Vedula

(10) Patent No.: US 7,606,361 B2
(45) Date of Patent: Oct. 20, 2009

(54) SENDING A MESSAGE SECURELY OVER AN INSECURE CHANNEL

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 10/908,187

(22) Filed: May 2, 2005

(65) Prior Publication Data

US 2006/0210067 A1  Sep. 21, 2006

(30) Foreign Application Priority Data

Mar. 18, 2005 (IN) ............... 280/CHE/2005

(51) Int. Cl.
  *H04L 9/28* (2006.01)
  *H04L 9/32* (2006.01)
(52) U.S. Cl. ............... 380/28; 380/44; 380/47; 380/277; 380/278; 380/282; 713/170; 713/171; 713/182; 726/2; 726/26
(58) Field of Classification Search ............ 380/28
  See application file for complete search history.

(56) References Cited

U.S. PATENT DOCUMENTS

| | | | | |
|---|---|---|---|---|
| 4,322,577 A | * | 3/1982 | Brandstrom | 380/37 |
| 4,668,103 A | * | 5/1987 | Wilson | 380/30 |
| 5,295,188 A | * | 3/1994 | Wilson et al. | 380/30 |
| 5,892,899 A | * | 4/1999 | Aucsmith et al. | 726/27 |
| 2004/0039918 A1 | | 2/2004 | Prashanth | |
| 2004/0062390 A1 | * | 4/2004 | Slavin | 380/30 |
| 2004/0174995 A1 | * | 9/2004 | Singh | 380/30 |
| 2005/0117745 A1 | * | 6/2005 | Lee et al. | 380/30 |
| 2005/0207577 A1 | * | 9/2005 | England et al. | 380/213 |
| 2005/0210260 A1 | * | 9/2005 | Venkatesan et al. | 713/180 |

OTHER PUBLICATIONS

Hugh C. Davis, "Referential Integrity of Links in Open Hypermedia Systems", Multicosm Ltd. and The Multimedia Research Group, pp. 207-216, The Department of Electronics an Computer Science, The University of Southampton, Southampton, SO 17 1BJ, UK.
Pentti A. Honkanen, The Integrity Problem, and What Can Be Done About it Usingtoday's DBMSS from the Database Fall', pp. 21-27, Georgia State University 1989.

* cited by examiner

*Primary Examiner*—Christian LaForgia
*Assistant Examiner*—Jenise E Jackson
(74) *Attorney, Agent, or Firm*—Narendra Reddy Thappeta

(57) ABSTRACT

Sending a message securely on an insecure channel. The message is encoded in the form of a singular matrix, and multiplied with a first non-singular matrix. The resulting first cipher data is sent to a receiver system. Receiver system multiplies the first cipher data with a second non-singular matrix and the resulting second cipher data is sent to the sender system. The sender system multiplies the second cipher data with the inverse of the first non-singular matrix, and the result is sent to the receiver system. The receiver system multiplies the received result with the inverse of the second non-singular matrix to recover the message.

14 Claims, 5 Drawing Sheets

$$Y = \begin{bmatrix} 1 & 2 & 3 & 4 \\ 5 & 6 & 7 & 8 \\ 9 & 10 & 11 & 12 \\ ? & ? & ? & ? \end{bmatrix}$$

FIG. 3A

$$Y = \begin{bmatrix} 1 & 2 & 3 & 4 \\ 5 & 6 & 7 & 8 \\ 9 & 10 & 11 & 12 \\ 15 & 18 & 21 & 24 \end{bmatrix}$$

FIG. 3B

SENDING A MESSAGE SECURELY OVER AN INSECURE CHANNEL

BACKGROUND OF THE INVENTION

1. Field of the Invention

The present invention generally relates to cryptography, and more specifically to a method and apparatus for sending a message securely over an insecure channel.

2. Related Art

In general, data transmitted on insecure channels can potentially be intercepted and examined by unknown third parties (intruders). There is a general recognised need in the industry to send messages securely (i.e., an intruder cannot decipher a message encoded in the transmitted data) even on such insecure channels.

Encryption technologies are often employed to transmit messages securely over an insecure channel. In general, a sender encrypts a message to generate cipher data, and send the cipher data on the insecure channel. An intruder can only decipher the message from the cipher data using a decryption technique consistent with the encryption technique.

One common encryption/decryption technique combination is based on public key infrastructure (PKI), in which a receiver generates a key pair (private key and public key) using known mathematical approaches. The public key is then communicated to any of the potential senders.

A sender encrypts a message using the public key and sends the resulting cipher data on an insecure channel. In most practical scenarios, only a receiver having access to the private key can recover the message from the cipher data. Accordingly, messages may be sent in a secure manner, even on insecure channels.

One problem with the keys based approach of above is that security of the messages depends on intruders not having access to the private key (or any other key required for decryption). Once the private key is compromised, an intruder may be able to decipher the messages with ease. As the key pair may not change for a long time, the approach is particularly susceptible to compromise of the private key, and thus of security.

What is therefore needed is a method and apparatus which enables messages to be sent securely on insecure channels, while addressing one or more of the requirements noted above.

BRIEF DESCRIPTION OF THE DRAWINGS

The present invention will be described with reference to the accompanying drawings briefly described below.

FIGS. 3A and 3B together illustrate the manner in which a message can be encoded in the form of a singular matrix in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention enables sending of a message securely on an insecure channel by taking advantage of the facts that a singular matrix (in which a row/column is linearly dependent on the remaining rows/columns) when multiplied by a non-singular matrix results in a singular matrix, and singular matrices do not have inverses. Thus, a sender system encodes a message to be sent in a singular matrix, and multiples the singular matrix with a first non-singular matrix. The resulting first cipher data is sent to the receiver system, which further multiplies the first cipher data with a second non-singular matrix to generate a second cipher data. The second cipher data is sent to the sender system.

The sender system multiplies the second cipher data with an inverse of the first non-singular matrix to generate a third cipher data, which is sent to the receiver system. The receiver system multiplies the third cipher data with an inverse of the second non-singular matrix to recover the message.

At least from the description below, it would be appreciated that an intruder having access to all the three cipher data may not be able to decipher the message. As a result, the message is deemed to be sent in a secure manner, even if the communication channel is insecure.

In addition, the non-singular matrices can be different (dynamically generated) for different messages, and thus comprise of the keys may not be of substantial concern. Furthermore, as no key exchange needs to potentially take place a priori, the approach can be used to transfer messages between any pair of previously unknown systems.

In one embodiment, the message thus exchanged forms a key, which is then used for encryption/decryption according to known approaches.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
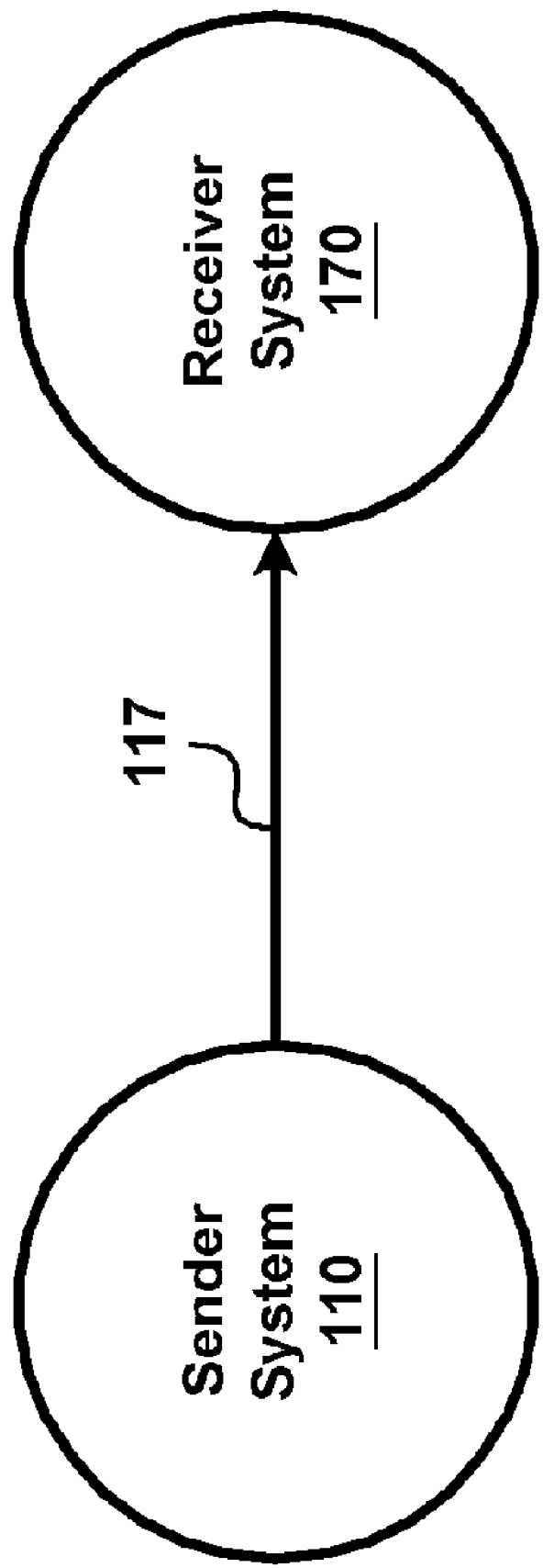
FIG. 1 is a block diagram of an example environment in which various aspects of the present invention can be implemented.

FIG. 1 is a block diagram illustrating an example environment in which various aspects of the present invention can be implemented. The environment is shown containing sender system 110 is shown connected to receiver system 170 by path 117. Path 117 represents an insecure communication channel such as the widely used Internet. The manner in which sender system 110 can send a message to receiver system 170 in a secure manner according to various aspects of the present invention is described below in further detail,

3. Sending Messages to Receiver

Figure 2:
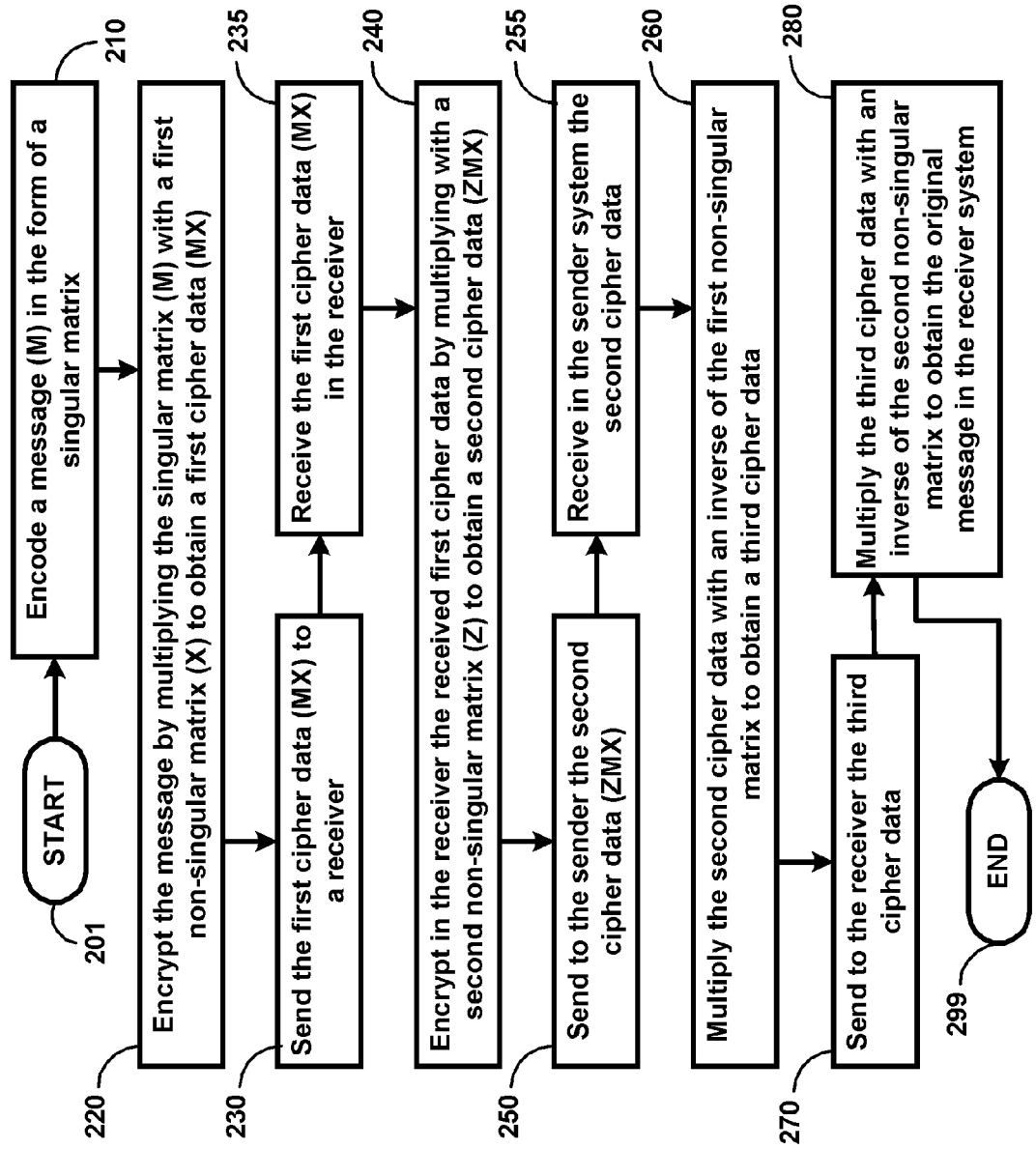
FIG. 2 is a flowchart illustrating the manner in which a sender system sends message securely to a receiver system on an insecure channel according to an aspect of the present invention.

FIG. 2 is a flowchart illustrating the manner in which a sender may send a message securely to a receiver even if the connecting communication channel is insecure according to an aspect of the present invention. The flowchart is described with respect to FIG. 1 merely for illustration. However, the approach(es) can be implemented in other environments as well. The flowchart begins in step 201, in which control passes to step 210.

In step 210, sender system 110 encodes a message (M) in the form of a singular matrix. The manner in which such encoding may be performed in an N×N matrix is described in sections below with respect to FIGS. 3A and 3B in further detail.

In step 220, sender system 110 encrypts the message by multiplying the singular matrix (M) with a first non-singular matrix (X) to obtain a matrix representing the first cipher data (MX). In step 230, sender system 110 sends the first cipher data (MX) to receiver system 170 on path 117. In step 235, receiver system 170 receives the first cipher data (MX). The data transmission between sender system 110 and receiver system 170 can be according to any known protocols.

In step 240, receiver system 170 encrypts the received first cipher data (MX) by multiplying with a second non-singular matrix (Z) to obtain a second cipher data (ZMX). In step 250, receiver system 170 sends the second cipher data (ZMX) to sender system 110. In step 255, sender system 110 receives the second cipher data (ZMX).

In step 260, sender system 110 multiplies the second cipher data (ZMX) with an inverse of the first non-singular matrix (X−1) to obtain a third cipher data equaling (ZM). In step 270, sender system 110 sends the third cipher data (ZM) to receiver system 170.

In step 280, receiver system 170 multiplies the third cipher data (ZM) with an inverse of the second non-singular matrix (Z−1) to obtain the original message (M) in receiver system 170. The method thus ends in step 299.

Accordingly, it may be appreciated that the original message is recovered in receiver system 170. The basis for asserting that the message is transmitted securely is described below.

4. Basis for Asserting Secure Transmission

By examining the flow-chart of FIG. 2, it may be appreciated that the set of cipher data transmitted on path 117 include MX, ZMX and ZM. Since M is a singular matrix, all three cipher data represent singular matrices, and thus each (of the three) cipher data does not have a corresponding inverse. Thus, it may not be possible for an intruder to decipher Z based on ZMX and MX, and X from ZMX and ZM (even assuming that the intruder has access to all three cipher data).

By appropriate choice of size (large dimension) and elements of the three base matrices M, X and Z, the task of factoring/deciphering individual base matrices can be made substantially computationally intensive, as can be readily appreciated by one skilled in the relevant arts. However, as described above, the message to be transmitted is to be encoded in a singular matrix (step 210). The manner in which such encoding can be performed, is described below.

5. Encoding Message in a Singular Matrix

FIGS. 3A and 3B together illustrate the manner in which a message can be encoded in a singular matrix M of dimension N×N. As noted above, a matrix is said to be singular is a row (or column) is linearly dependent on other rows. In the example illustration, it is assumed that singular property is achieved by having linear dependency among rows.

Thus, with respect to FIG. 3A, the message to be transmitted is first encoded in the (N−1) rows (with each row having N elements). The Ith element of the Nth row (MNI) is then computed using the following formula:

MNI=ΣMJI×RJ, wherein J has values from 1 to (N−1), RJ represents any number used consistently for the corresponding column in computation of each element of the Nth row, and Σ represents the cumulative addition.

FIG. 3B contains the result of such computation assuming RJ=1 for all rows 1 to 3. However, different values can be used for RJ to increase the complexity of computation if one attempts to factor the cipher data transmitted on path 117. Additional computation complexity requirements can be attained by making sure at least some of the elements have fractions, using only some of the elements to encode the message and using a self-encoding (e.g., first row indicates which elements contain valid data) convention to indicate which elements validly encode the message, etc.

Thus, it may be appreciated that the message is sent securely as well. It may be further desirable to ensure that "man-in-the-middle" attacks (in which an intruder intercepts each data sent on path 117, and sends some other data to the corresponding destination, while the recipient does not 'know' the actions of the intruder) have not occurred in the data exchanges of the flow-chart of FIG. 2. The manner in which sender system 110 and receiver system 170 may confirm that such attacks have not occurred, is described below with respect to FIG. 4.

6. Confirming Absence of Intruder Activity

Figure 4:
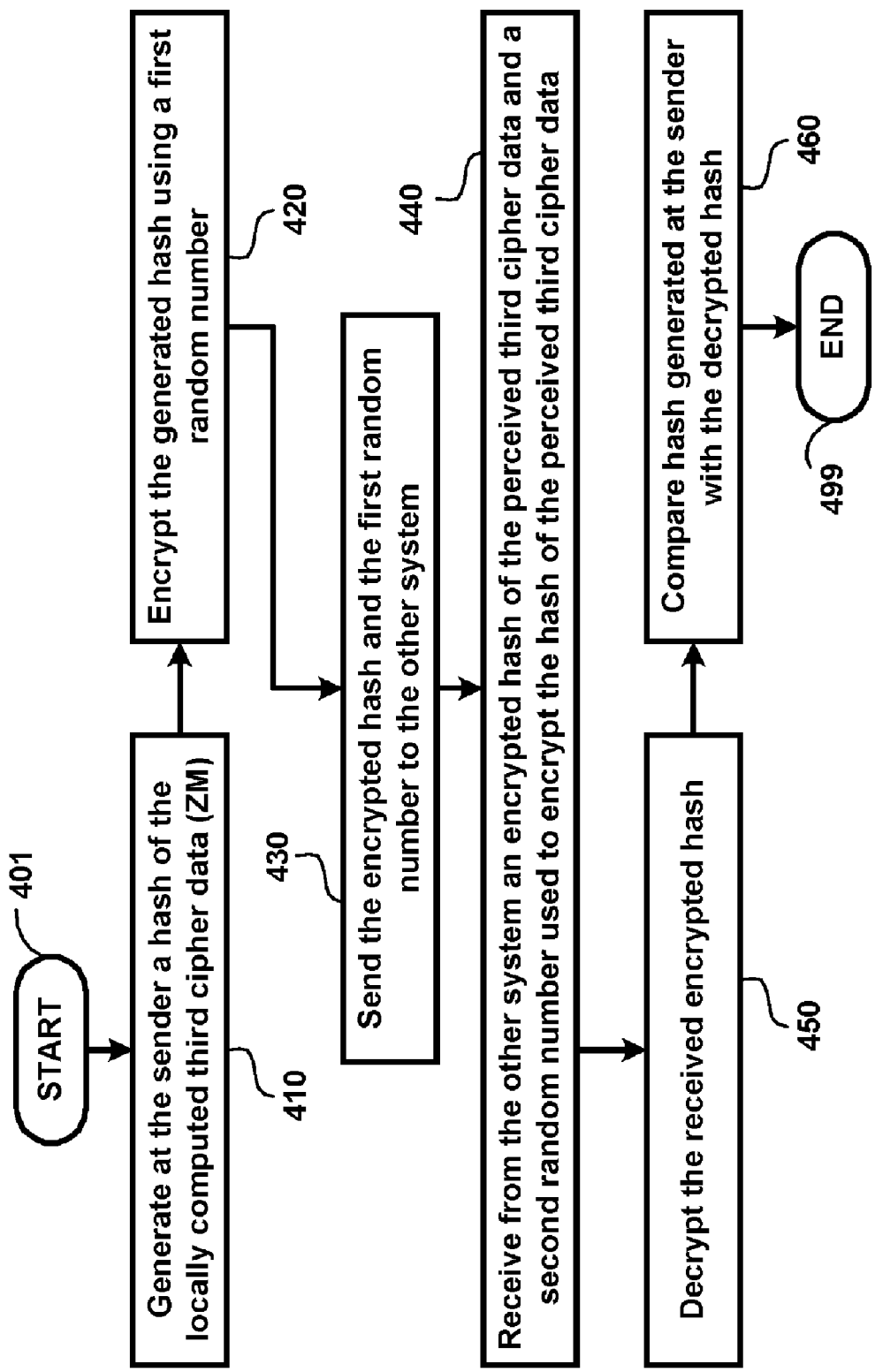
FIG. 4 is a flowchart illustrating the manner in which absence of man-in-the-middle attacks can be checked in an embodiment of the present invention.

FIG. 4 is a flowchart illustrating the manner in which sender system 110 and receiver system 170 may ensure absence of intruder activity in an embodiment of the present invention. The actions of the flowchart are symmetrical (performed by both), but are described with respect to sender system 110 only, for conciseness. In addition, for illustration, the message identification conventions (X, M and Z) of FIG. 2 are used here also. The flowchart begins in step 401, in which control passes to step 410.

In step 410, sender system 110 generates a hash of the locally computed third cipher data (ZM). In an embodiment, MD5 hash, well known in the relevant arts, is generated. In step 420, sender system 110 encrypts the generated hash using a first random number as a key. Various encryption techniques, well known in the relevant arts can be used. In step 430, sender system 110 sends the encrypted hash and the first random number to receiver system 170, potentially in different packets on path 117.

In step 440, sender system 110 receives from receiver system 170 an encrypted hash of the perceived third cipher data (generated in step 260, described above) and a second random number used to encrypt the hash of the perceived third cipher data. The received encrypted hash is generated similar to the encrypted hash generated in step 410, and the second random number is used similar to the first random number as in step 420, but in receiver system 170.

In step 450, sender system 110 decrypts the received encrypted hash using the second random number. The decryption needs to be consistent with the encryption approach used in receiver system 170. In step 460, sender system 110 checks for equality of the hash generated in step 410 with the decrypted hash. If there is equality, absence of man-in-the-middle attack is assumed. The flowchart ends in step 499.

It should be appreciated that the third cipher data is used in the flowchart of FIG. 4 since ZM is computationally generated in both sender and receiver systems based on the value they received from the other party. Thus, by using the approach of FIG. 4, systems 110 and 170 may confirm the absence of man-in-the-middle attacks.

It should be further appreciated that the features described above can be implemented in various embodiments. The description is continued with respect to an embodiment in which various features are operative when software instructions are executed.

7. Digital Processing System

Figure 5:
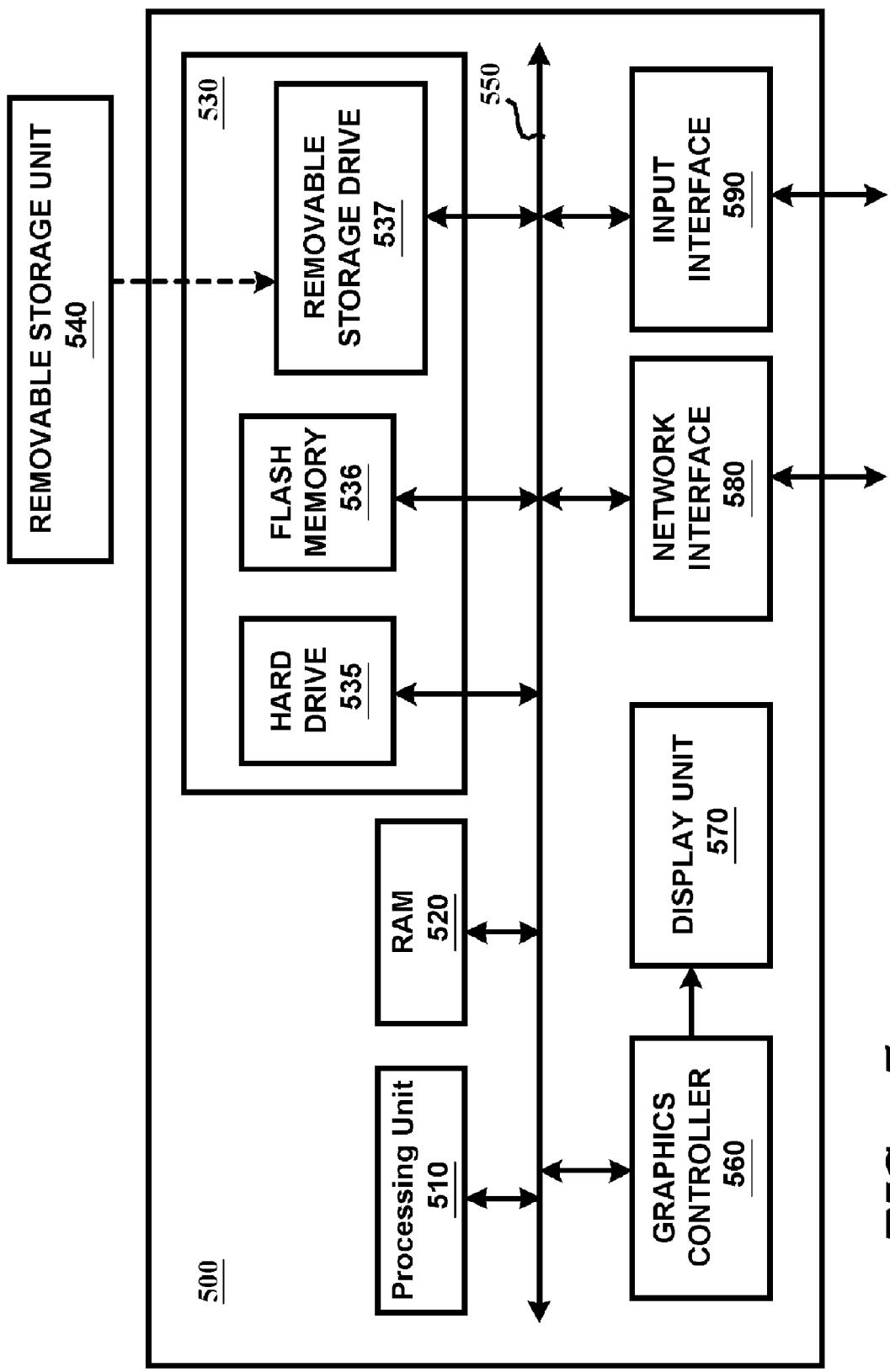
FIG. 5 is a block diagram illustrating an example embodiment in which various aspects of the present invention are operative when software instructions are executed.

FIG. 5 is a block diagram illustrating the details of digital processing system 500 in which various aspects of the present invention are operative by execution of appropriate software instructions. System 500 may correspond to sender system 110 or receiver system 170. System 500 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a key-board and/or mouse. Network interface 580 provides connectivity to a network (e.g., using Internet Protocol), and may be used to communicate on path 117.

Secondary memory 530 may contain hard drive 535, flash memory 536 and removable storage drive 537. Secondary memory 530 may store the data and software instructions (e.g., methods instantiated by each of client system), which enable system 500 to provide several features in accordance with the present invention. Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format
compatible with removable storage drive 537 such that removable storage drive 537 can read
the data and instructions. Thus, removable storage unit 540 includes a computer readable storage medium having stored therein computer software and/or data.

In this document, the term "computer program product" is used to generally refer to removable storage unit 540 or hard disk installed in hard drive 535. These computer program products are means for providing software to system 500. CPU 510 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of sending a message securely from a sender system to a receiver system over an insecure channel, said method comprising:

encoding said message in the form of a singular matrix;

multiplying said singular matrix with a first non-singular matrix to obtain a first cipher data;

sending said first cipher data, containing said message, to said receiver system over said insecure channel;

receiving said first cipher data in said receiver system;

multiplying said first cipher data with a second non-singular matrix to obtain a second cipher data in said receiver system;

sending said second cipher data, containing said message, to said sender system over said insecure channel;

receiving in said sender system said second cipher data over said insecure channel;

multiplying said second cipher data with an inverse of said first non-singular matrix to obtain a third cipher data;

sending said third cipher data, containing said message, to said receiver system over said insecure channel; and multiplying said third cipher data with an inverse of said second non-singular matrix to obtain said message in said receiver system, whereby said message is sent securely from said sender system to said receiver system over said insecure channel without key exchange between said sender system and said receiver system.

2. The method of claim 1, further comprising:

generating at said sender system a first hash of the locally computed third cipher data;

encrypting first hash using a first random number to generate a first encrypted hash;

sending said first encrypted hash and said first random number to said receiver system;

receiving from said receiver system a second encrypted hash of the perceived third cipher data and a second random number used to encrypt the hash of said perceived third cipher data;

decrypting said second encrypted hash using said second random number; and checking for equality of said hash with the second hash.

3. A method of sending a message securely from a sender system to a receiver system over an insecure channel, said method being performed in said sender system, said method comprising:

encoding said message in the form of a singular matrix;

multiplying said singular matrix with a first non-singular matrix to obtain a first cipher data;

sending said first cipher data, containing said message, to said receiver system over said insecure channel;

receiving over said insecure channel a second cipher data, containing said message, wherein said second cipher data is generated in said receiver system by multiplying said first cipher data with a second non-singular matrix;

multiplying said second cipher data with an inverse of said first non-singular matrix to obtain a third cipher data; and sending said third cipher data, containing said message, to said receiver system over said insecure channel, wherein said receiver system multiplies said third cipher data with an inverse of said second non-singular matrix to obtain said message, whereby said message is sent securely from said sender system to said receiver system over said insecure channel without key exchange between said sender system and said receiver system.

4. The method of claim 3, further comprising:
generating a first hash of said third cipher data;
encrypting said first hash using a first random number to generate a first encrypted hash;
sending said first encrypted hash and said first random number to said receiver system;
receiving another hash of third cipher data computed in said receiver system;
checking for equality of said first hash with said another hash.

5. A method of receiving a message securely in a receiver system, wherein said message is sent by a sender system over an insecure channel, said method comprising:
receiving over said insecure channel a first cipher data, containing said message, wherein said first cipher data is obtained by multiplying a singular matrix with a first non-singular matrix to obtain a first cipher data, wherein said message is encoded in the form of said singular matrix;
multiplying said first cipher data with a second non-singular matrix to obtain a second cipher data;
sending said second cipher data, containing said message, to said sender system over said insecure channel;
receiving over said insecure channel a third cipher data, containing said message, from said sender system, wherein said third cipher data is obtained in said sender system by multiplying said second cipher data with an inverse of said first non-singular matrix; and
multiplying said third cipher data with an inverse of said second non-singular matrix to obtain said singular matrix, wherein said message is determined from said singular matrix,
whereby said message is received securely by said receiver system over said insecure channel without key exchange between said sender system and said receiver system.

6. The method of claim 5, further comprising:
multiplying said first singular matrix with said second non-singular matrix to generate a locally computed third cipher data; and
comparing said locally computed cipher data with said third cipher data.

7. A computer readable medium carrying one or more sequences of instructions for causing a sender system to send a message securely to a receiver system over an insecure channel, wherein execution of said one or more sequences of instructions by one or more processors contained in said sender system causes said one or more processors to perform the actions of:
encoding said message in the form of a singular matrix;
multiplying said singular matrix with a first non-singular matrix to obtain a first cipher data;
sending said first cipher data, containing said message, to said receiver system over said insecure channel;
receiving over said insecure channel a second cipher data, containing said message, wherein said second cipher data is generated in said receiver system by multiplying said first cipher data with a second non-singular matrix;
multiplying said second cipher data with an inverse of said first non-singular matrix to obtain a third cipher data; and
sending said third cipher data, containing said message, to said receiver system over said insecure channel,
wherein said receiver system multiplies said third cipher data with an inverse of said second non-singular matrix to obtain said message,
whereby said message is sent securely from said sender system to said receiver system over said insecure channel without key exchange between said sender system and said receiver system.

8. The computer readable medium of claim 7, further comprising:
generating a first hash of said third cipher data;
encrypting said first hash using a first random number to generate a first encrypted hash;
sending said first encrypted hash and said first random number to said receiver system;
receiving another hash of third cipher data computed in said receiver system;
checking for equality of said first hash with said another hash.

9. A computer readable medium carrying one or more sequences of instructions for causing a receiver system to receive a message securely, wherein said message is sent by a sender system over an insecure channel, wherein execution of said one or more sequences of instructions by one or more processors contained in said receiver system causes said one or more processors to perform the actions of:
receiving over said insecure channel a first cipher data, containing said message, wherein said first cipher data is obtained by multiplying a singular matrix with a first non-singular matrix to obtain a first cipher data, wherein said message is encoded in the form of said singular matrix;
multiplying said first cipher data with a second non-singular matrix to obtain a second cipher data;
sending said second cipher data, containing said message, to said sender system over said insecure channel;
receiving a third cipher data, containing said message, from said sender system over said insecure channel, wherein said third cipher data is obtained in said sender system by multiplying said second cipher data with an inverse of said first non-singular matrix; and
multiplying said third cipher data with an inverse of said second non-singular matrix to obtain said singular matrix, wherein said message is determined from said singular matrix,
whereby said message is received securely by said receiver system over said insecure channel without key exchange between said sender system and said receiver system.

10. The computer readable medium of claim 9, further comprising:
multiplying said first singular matrix with said second non-singular matrix to generate a locally computed third cipher data; and
comparing said locally computed cipher data with said third cipher data.

11. A sender system sending a message securely to a receiver system over an insecure channel, said sender system comprising:

means for encoding said message in the form of a singular matrix;

means for multiplying said singular matrix with a first non-singular matrix to obtain a first cipher data;

means for sending said first cipher data, containing said message, to said receiver system over said insecure channel;

means for receiving over said insecure channel a second cipher data, containing said message, wherein said second cipher data is generated in said receiver system by multiplying said first cipher data with a second non-singular matrix;

means for multiplying said second cipher data with an inverse of said first non-singular matrix to obtain a third cipher data; and means for sending said third cipher data, containing said message, to said receiver system over said insecure channel, wherein said receiver system multiplies said third cipher data with an inverse of said second non-singular matrix to obtain said message, whereby said message is sent securely from said sender system to said receiver system over said insecure channel without key exchange between said sender system and said receiver system.

12. The sender system of claim 11, further comprising:

means for generating a first hash of said third cipher data;

means for encrypting said first hash using a first random number to generate a first encrypted hash;

means for sending said first encrypted hash and said first random number to said receiver system;

means for receiving another hash of third cipher data computed in said receiver system;

means for checking for equality of said first hash with said another hash.

13. A receiver system receiving a message sent by a sender system securely, said message being sent over an insecure channel, said receiver system comprising:

means for receiving a first cipher data, containing said message, wherein said first cipher data is obtained by multiplying a singular matrix with a first non-singular matrix to obtain a first cipher data, wherein said message is encoded in the form of said singular matrix;

means for multiplying said first cipher data with a second non-singular matrix to obtain a second cipher data;

means for sending said second cipher data, containing said message, to said sender system over said insecure channel;

means for receiving a third cipher data, containing said message, from said sender system over said insecure channel, wherein said third cipher data is obtained in said sender system by multiplying said second cipher data with an inverse of said first non-singular matrix; and means for multiplying said third cipher data with an inverse of said second non-singular matrix to obtain said singular matrix, wherein said message is determined from said singular matrix, whereby said message is received securely by said receiver system over said insecure channel without key exchange between said sender system and said receiver system.

14. The receiver system of claim 13, further comprising:

means for multiplying said first singular matrix with said second non-singular matrix to generate a locally computed third cipher data; and means for comparing said locally computed cipher data with said third cipher data.

\* \* \* \* \*